(12) United States Patent
Savoray et al.

(10) Patent No.: US 6,631,200 B1
(45) Date of Patent: Oct. 7, 2003

(54) TRUE-LIFE ELECTRONICS SIGNATURES

(75) Inventors: Uri Savoray, Rehovot (IL); Meir Levinger, Mountain View, CA (US)

(73) Assignee: Seal Systems Ltd., Kfar Sava (IL)

( * ) Notice: Subject to any disclaimer, the term of this patent is extended or adjusted under 35 U.S.C. 154(b) by 0 days.

(21) Appl. No.: 09/554,242

(22) PCT Filed: Nov. 17, 1998

(86) PCT No.: PCT/IL98/00560

§ 371 (c)(1),
(2), (4) Date: Jul. 11, 2000

(87) PCT Pub. No.: WO99/26181

PCT Pub. Date: May 27, 1999

(30) Foreign Application Priority Data

Nov. 17, 1997 (IL) ................................................. 122229

(51) Int. Cl.⁷ ................................................. G06K 9/00
(52) U.S. Cl. ....................................... 382/119; 382/186
(58) Field of Search ........................ 382/100, 115–123, 382/185–195, 199–202; 380/22–43; 235/379–380; 705/18.39, 64; 713/176–186

(56) References Cited

U.S. PATENT DOCUMENTS

| 5,042,073 A | * | 8/1991 | Collot et al. ................. 382/119 |
| 5,251,265 A | * | 10/1993 | Dohle et al. ................. 382/119 |
| 5,283,557 A | * | 2/1994 | Memarzadeh ................ 382/119 |
| 5,347,589 A | * | 9/1994 | Meeks et al. ................ 382/119 |
| 5,434,928 A | | 7/1995 | Wagner et al. |
| 5,473,709 A | | 12/1995 | Aoki |
| 5,544,255 A | * | 8/1996 | Smithies et al. ............. 382/119 |
| 5,559,897 A | * | 9/1996 | Brown et al. ................ 382/119 |
| 5,577,177 A | | 11/1996 | Collins et al. |
| 5,623,555 A | * | 4/1997 | Nelson et al. ............... 382/119 |
| 5,734,748 A | | 3/1998 | Amano |
| 5,892,824 A | * | 4/1999 | Beaston et al. ............. 382/119 |
| 6,011,873 A | * | 1/2000 | Desai et al. ................. 382/119 |

* cited by examiner

Primary Examiner—Jingge Wu
(74) Attorney, Agent, or Firm—Lowe Hauptman Gilman & Berner LLP

(57) ABSTRACT

A method for producing an electronic signature in a font format from a manual signature, comprising the steps of: (a) providing a raster image of the manual signature; (b) cleaning the raster image to remove noise, such that the raster image is a cleaned image; (c) locating a plurality of edges of the cleaned image; (d) producing an outline of the cleaned image from the plurality of edges; (e) analyzing the outline to determine a plurality of guidelines for the cleaned image; and (f) hinting the cleaned image from the plurality of guidelines to produce the electronic signature in the font format.

11 Claims, 7 Drawing Sheets

TRUE-LIFE ELECTRONICS SIGNATURES

FIELD AND BACKGROUND OF THE INVENTION

The present invention relates to a method for producing an electronic signature which incorporates all of the visual aspects of a true manual signature and, more specifically, to a method for producing a true-life electronic signature which is both secure and authenticatable.

Electronic documents are rapidly replacing paper documents as the preferred means of communicating information. For example, inter-office memos are now frequently distributed via e-mail rather than as a paper document. As office workers and other computer users have become more comfortable with reading and manipulating such electronic documents, the frequency with which paper documents are being replaced has increased. Electronic documents offer many advantages over paper documents. For example, electronic documents are easier to store. The same electronic document can easily be sent to multiple recipients, without tedious reproduction of the document with a photocopying machine, for example. Thus, many computer users now prefer electronic documents over paper documents for communication.

One difficulty with electronic documents has been the need for authentication and verification of the author of the document. Paper documents are typically signed or initialed by the author of the document with a pen, so that the paper material itself is indelibly marked. Later attempts to remove or alter the signature from the paper document are thus clearly visible, so that the authenticity of the signature is easy to determine from an inspection of the document itself.

Such authenticity is particularly important for legal documents, such as contracts, and for financial documents, such as checks. Such documents do not simply provide information. Instead, they authorize the performance of a specific act, such as transferring money from the bank account of the signator of the check. Thus, these types of documents require particularly stringent standards for authentication and verification, in order to prevent acceptance of a forged signature.

Until recently, no equivalent to the manual signature was available for electronic documents, let alone an equivalent which would satisfy the stringent standards for legal and financial documents. Simply capturing a manual signature electronically, and then pasting the electronic signature into the document, does not provide any authentication or verification. Such a simple electronic signature can be easily copied without the knowledge or authorization of the author, in a manner which is not detectable as a forgery. Thus, simple electronic signatures do not provide a satisfactory equivalent to the manual signature.

A method for providing a verifiable electronic signature was disclosed in U.S. Pat. No. 5,606,609. This method includes embedding a "security object" in an electronic document. The security object can then be verified at a later date to authenticate the author of the document, for example. The security object was described as an "electronic chop", which could be a digitized rendering of the author's signature, or some other image. However, no method is described for producing such a digitized rendering for the signature. Merely using an electronic scanner to capture an image such as a manual signature is not satisfactory because of the low quality and resolution of the captured image. The captured image should have a typographical quality at least as good as the rest of the electronic document. Furthermore, if an electronic signature is to be accepted as the equivalent of a manual signature, it must look like a true-life handwritten signature, regardless of the quality of the scanning device. Thus, the electronic signature produced according to the method disclosed in U.S. Pat. No. 5,606,609 lacks these important characteristics.

There is therefore a need for, and it would be useful to have, a method for producing an electronic signature which is both verifiable and which closely resembles its manual, handwritten counterpart, with high quality resolution and visual appeal.

SUMMARY OF THE INVENTION

According to the present invention, there is provided a method for producing an electronic signature in a font format from a manual signature, comprising the steps of: (a) providing a raster image of the manual signature; (b) cleaning the raster image to remove noise, such that the raster image is a cleaned image; (c) locating a plurality of edges of the cleaned image; (d) producing an outline of the cleaned image from the plurality of edges; (e) analyzing the outline to determine a plurality of guidelines for the cleaned image; and (f) hinting the cleaned image from the plurality of guidelines to produce the electronic signature in the font format. Preferably, the raster image is in a format selected from the group consisting of a bitmap image and a graphic software application image. Also preferably, the noise includes pixels selected from the group consisting of solitary black pixels and missing pixels.

Preferably, the edges are located by finding a plurality of feature points of the cleaned image, the feature points being selected from the group consisting of curve points, horizontal extremum, vertical extremum, corners and tangents. More preferably, the outline includes at least one closed sequence of Bezier curves and straight line segments connected end-to-end. Most preferably, the guidelines are determined according to the horizontal extremum points, and the vertical extremum points.

Preferably, the font format is a TrueType™ font. More preferably, the step of hinting the image includes identifying at least one hint selected from the group consisting of stems and overshoot controls.

According to a preferred embodiment of the present invention, the method further comprises the step of: (g) preparing a digital chop object from the electronic signature in the font format by adding a rasterizer for the font format, the rasterizer being capable of rendering the electronic signature such that the electronic signature is converted into a visible image. Preferably, the digital chop object is an OLE™ software object. More preferably, the digital chop object further includes a safeguard mechanism such that the digital chop object is operable substantially only if a password is entered.

BRIEF DESCRIPTION OF THE DRAWINGS

The foregoing and other objects, aspects and advantages will be better understood from the following detailed description of a preferred embodiment of the invention with reference to the drawings, where-in.

DETAILED DESCRIPTION OF PREFERRED EMBODIMENTS

The present invention concerns a method for producing an electronic signature which is verifiable and which has the visual appearance of a true-life, handwritten manual signature. Specifically, the electronic signature produced according to the method of the present invention should look like a true-life signature and be of a typographical quality at least as good as the rest of the document. Being an equivalent to a script font, the signature should look like a true-life handwritten signature, regardless of the resolution and quality of the imaging device.

The function of the conversion software operating according to the method of the present invention is described in more detail in the following illustrations. The main function of the conversion software is to convert a raster or bitmap image of a manual, handwritten signature into a scaleable font format. The image source should be an ordinary electronic scanner device. The conversion can be done automatically, but user intervention is possible at several stages to enhance or correct the program's decisions. Manual corrections are automatically abstracted and incorporated into the program's knowledge base, in effect enabling the program to learn how to perform the conversion more efficiently.

Briefly, the conversion process is as follows. First, the manual, handwritten signature is given to the conversion software as a raster file, for example as a bitmap image. Next, preferably the image is "cleaned" to remove extraneous noise. Then, the edges of the image are located, and an outline of the image is produced. The outline is then analyzed to determine the guidelines. Finally, preferably the image is "hinted" to produce the signature data file in the preferred font format. The signature data file can then be bundled into a software object as described in further detail below.

Figure 1:
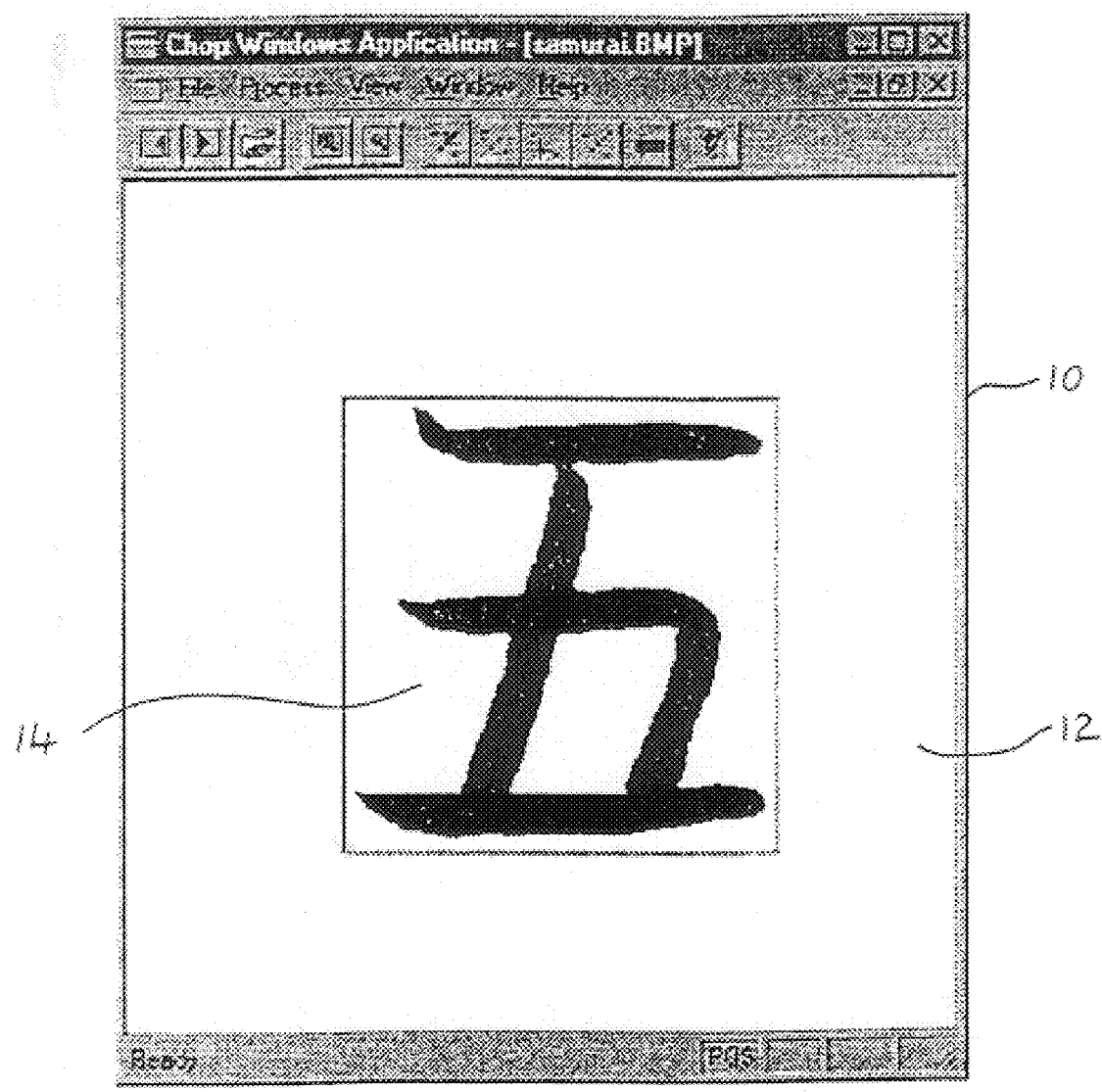
FIG. 1 is an exemplary illustration of an initial display by a screen display by software operating according to the method of the present invention.

FIG. 1 shows an exemplary illustration of a screen display from the rasterizer software of the present invention. A screen display 10 is shown of the rasterizer software as operated by one of the Windows™ operating systems. Within a display portion 12 of screen display 10, an exemplary raster signature image 14 is shown, which in this case is of a Japanese kanji character, it being understood that this is for illustrative purposes only and is not meant to be limiting. The rasterizer software application preferably accepts raster signature image 14 as a bitmap image in BMP format. Alternatively, the original image can be scanned through a Twain™ compliant scanner, and input directly into the software application. Optionally, raster signature image 14 can also be the output of any standard graphic program, which has the advantage of permitting pre-processed or edited images. Finally, raster signature image 14 can be in the format of a file produced by the rasterizer of the present invention.

Figure 2:
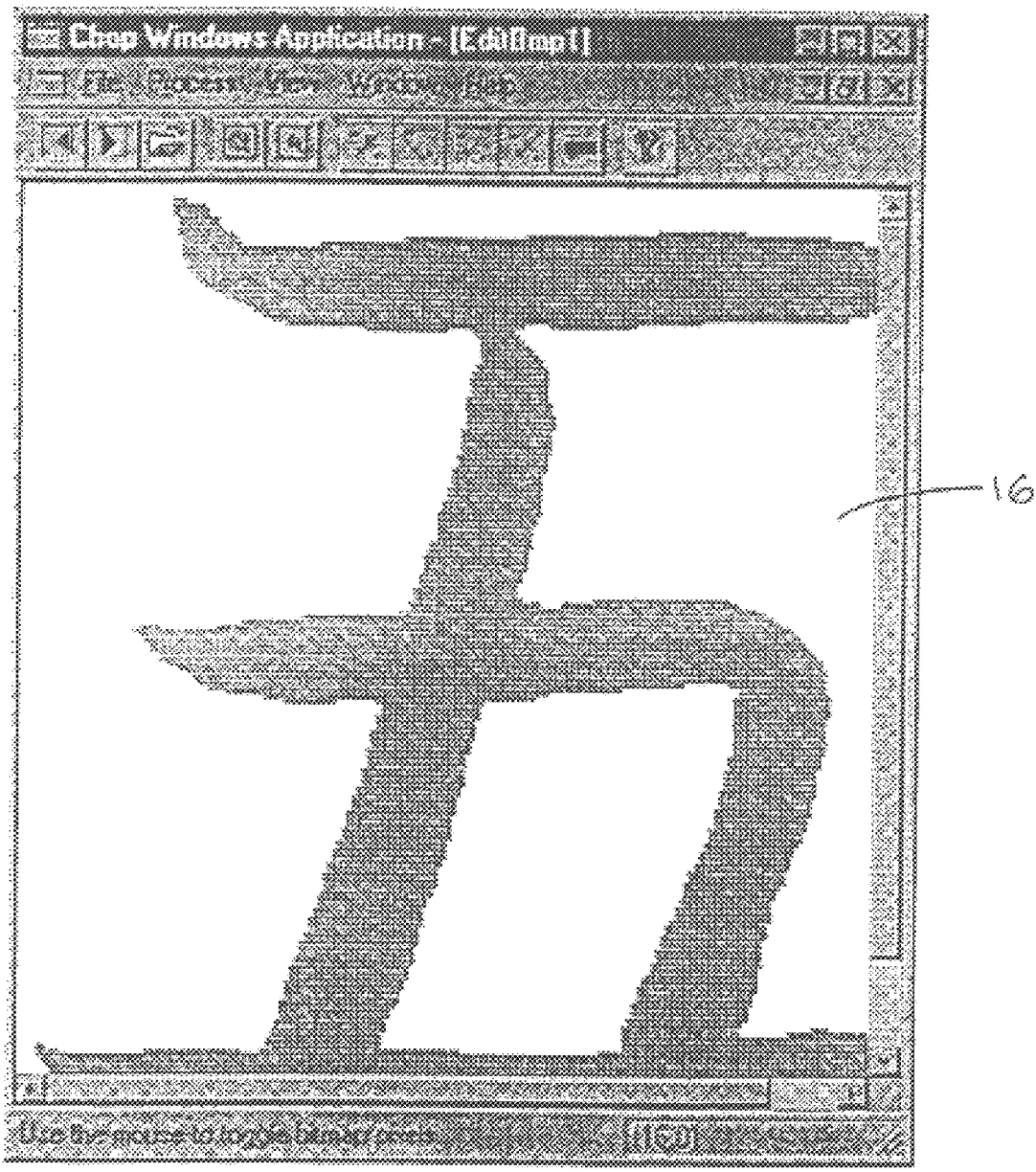
FIG. 2 shows the initial display of FIG. 1 after a cleaning process.

FIG. 2 shows the image of FIG. 1 after the first stage of image processing according to the present invention. A cleaned raster signature image 16 is shown, after a pixel clean-up process has been performed. This process entails erasing solitary black pixels and filling in missing pixels, which are assumed to be image "noise". Preferably, the user can then choose to accept the decisions made by the rasterizer, or correct them by adding or deleting individual pixels or groups of pixels to produce the final image as cleaned raster signature image 16.

Figure 3:
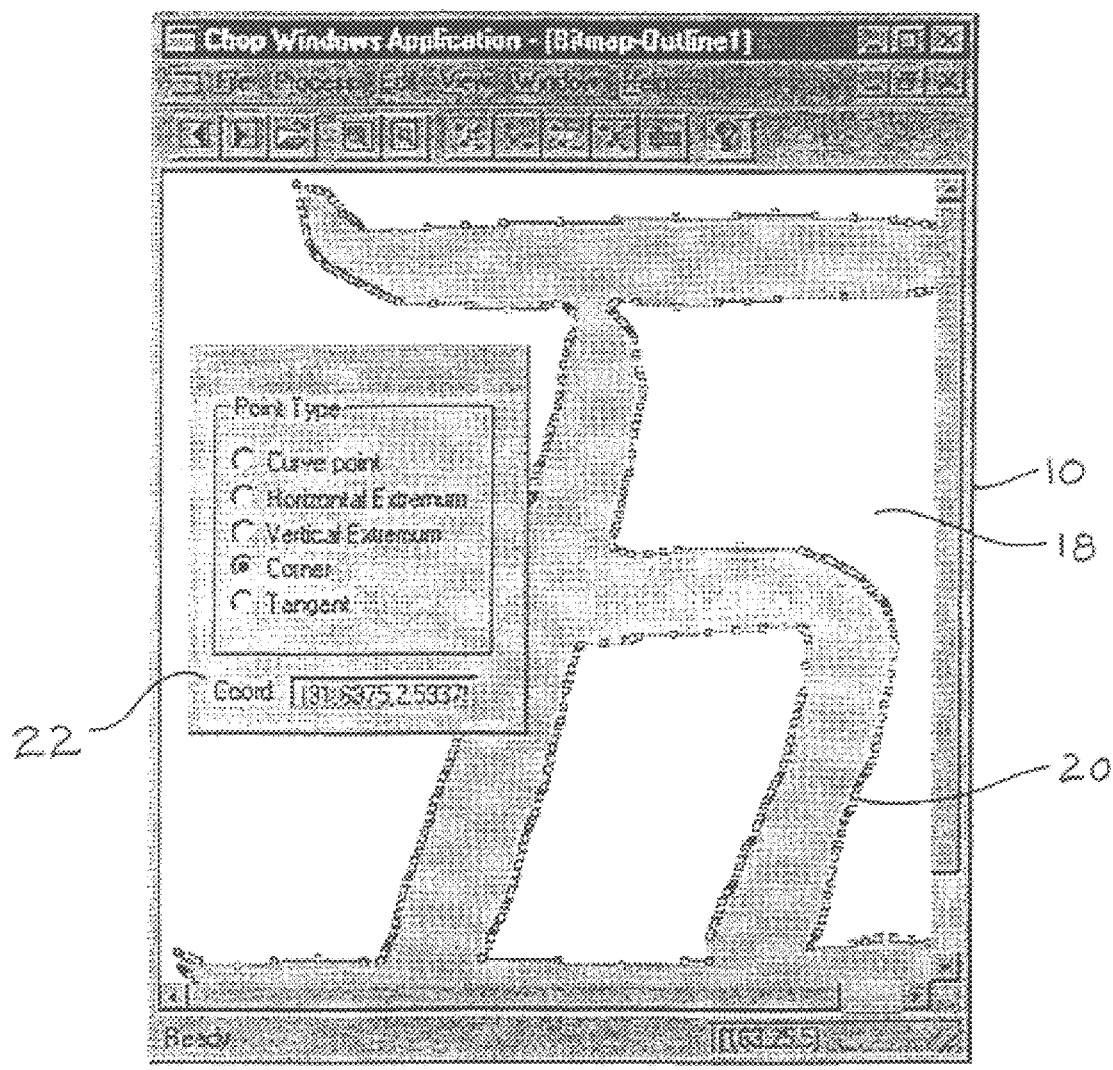
FIG. 3 shows the display of FIG. 2 after feature point recognition has been performed.

FIG. 3 shows the cleaned raster signature image of FIG. 2 after feature points have been recognized and tagged. Screen display 10 now shows a tagged signature image 18, in which each of the feature points 20 have been tagged according to function. The recognized features include curve points, horizontal extremum, vertical extremum, corners and tangents, as shown in a classification dialog box 22. Preferably, the user is able to add one or more feature points 20, delete one or more feature points 20 and change the classification of points 20.

Figure 4A:
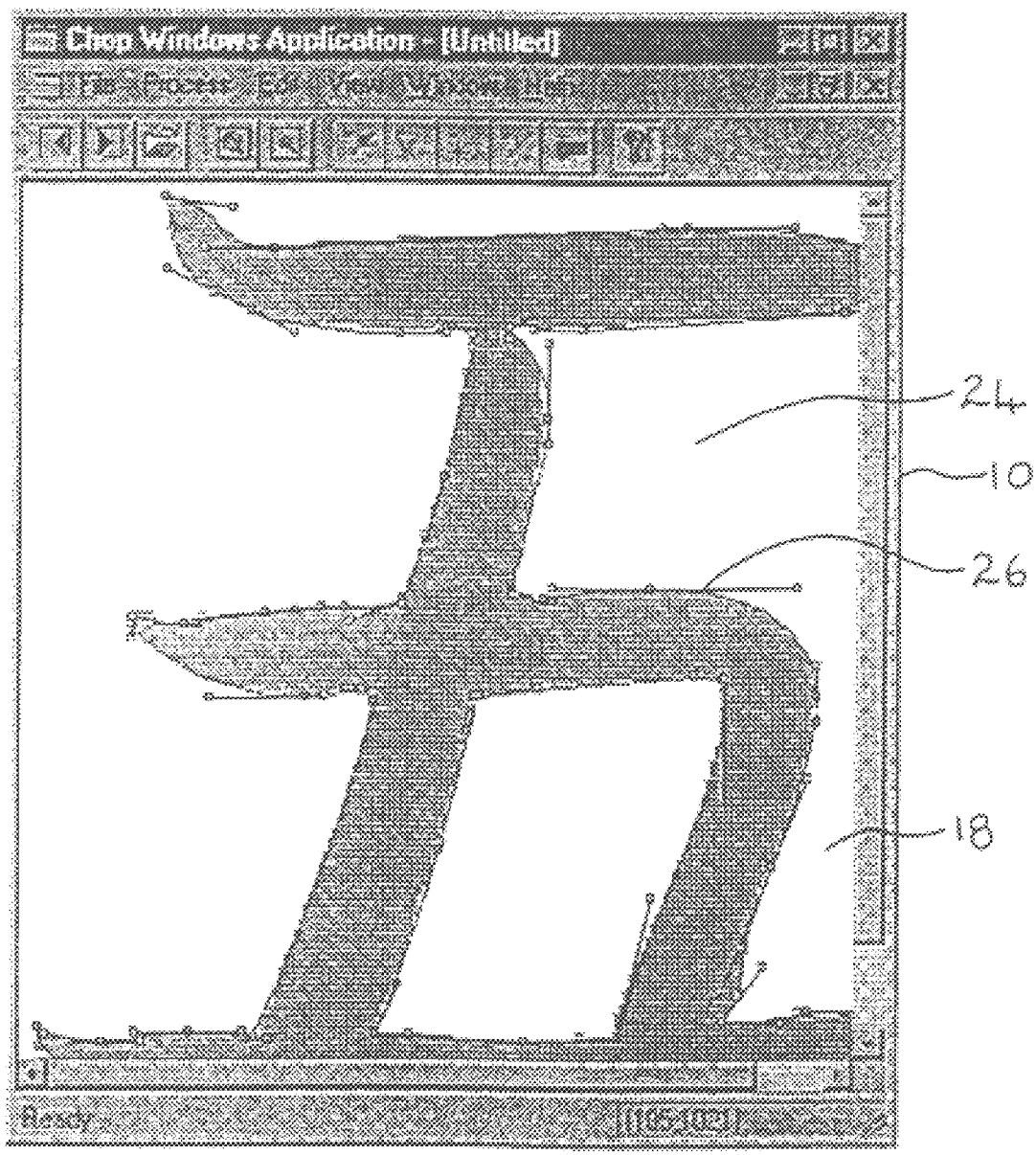
FIGS. 4A and 4B show the display of FIG. 3 after outline creation.
Figure 4B:
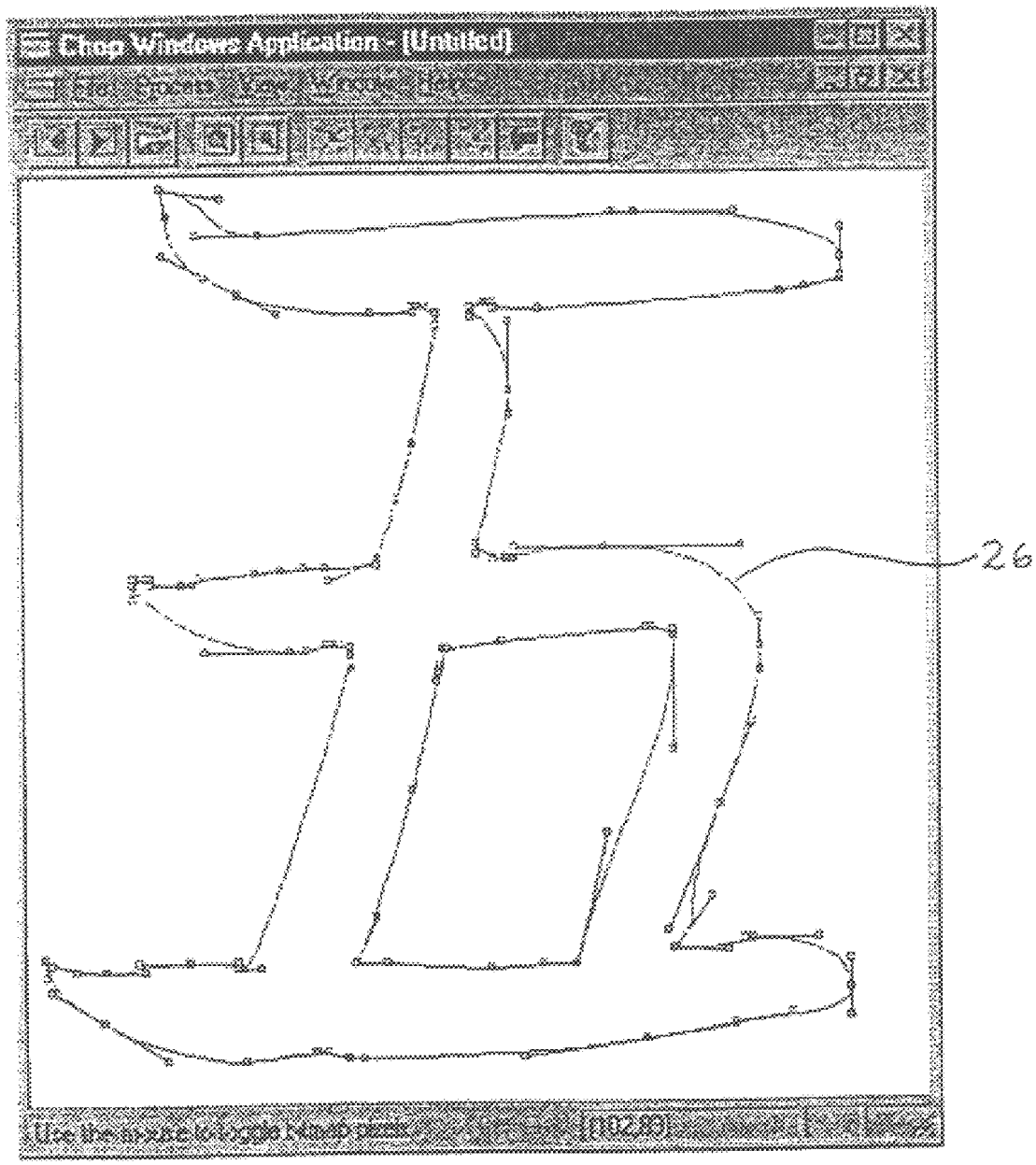

In the next stage of image processing, an outline of the tagged signature image is created, as shown in FIGS. 4A and 4B. In FIG. 4A, screen display 10 shows an outlined image 24, in which an outline 26 has been superimposed on tagged signature image 18. Outline 26 is an envelope of tagged signature image 18, created according to feature points 20 recognized earlier. Outline 26 is composed of one or more closed sequences of Bezier curves and straight line segments connected end-to-end, which define the transition from white to black in the graphic space. FIG. 4B shows outline 26 alone, without tagged signature image 18.

Figure 5:
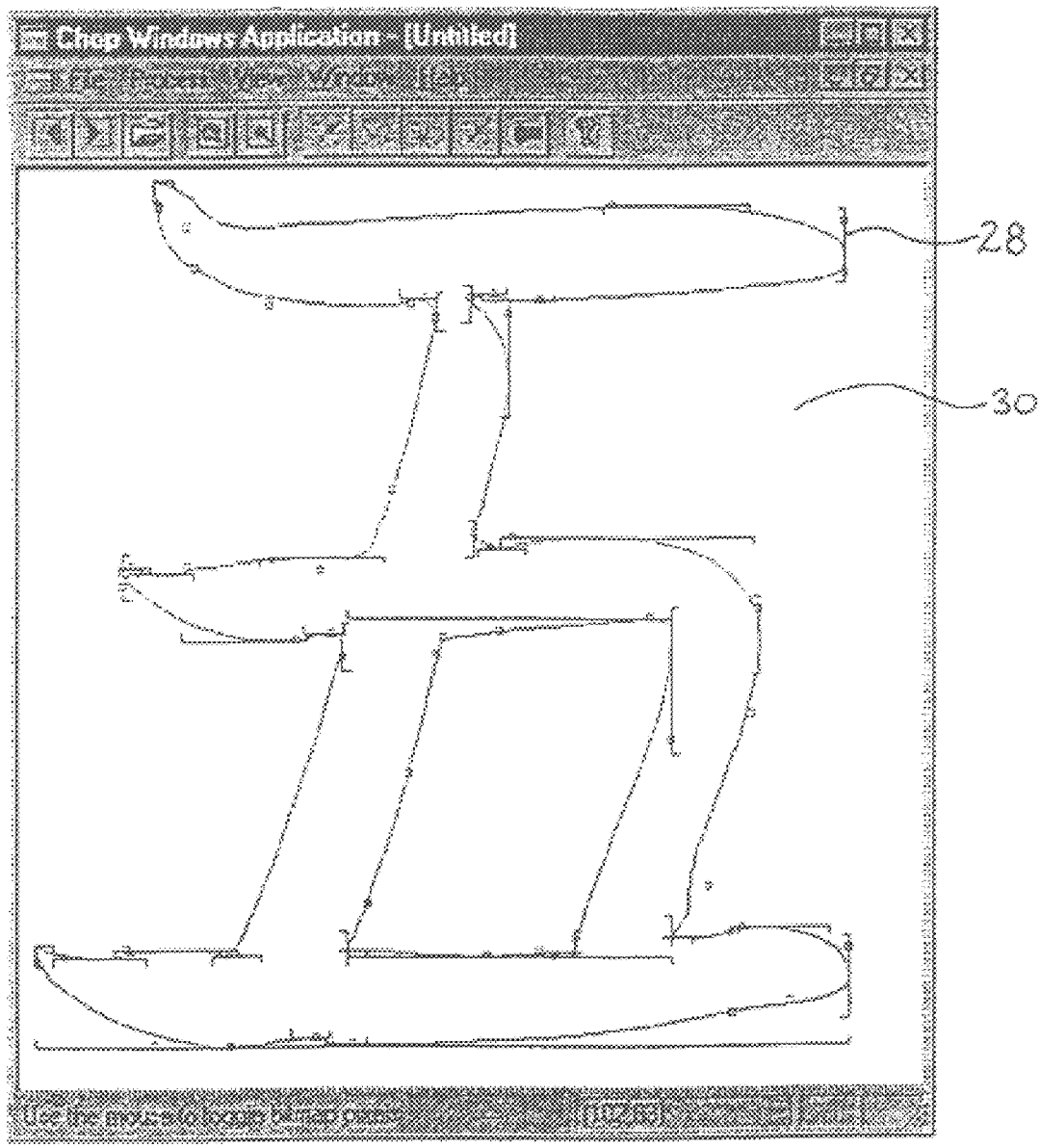
FIG. 5 shows the outline of FIGS. 4A and 4B after guideline identification.

After the creation of the outline of the signature image, a plurality of guidelines 28 are identified for the signature image, which is shown in FIG. 5 as a guideline image 30. Guidelines 28 are the major and minor vertical and horizontal guidelines, which serve to identify the geometrical features of the signature image. Guidelines 28 are produced according to the vertical and horizontal extremum points. Guidelines 28 are necessary to convert the signature image into a font type, such as a TrueType™ font.

Figure 6:
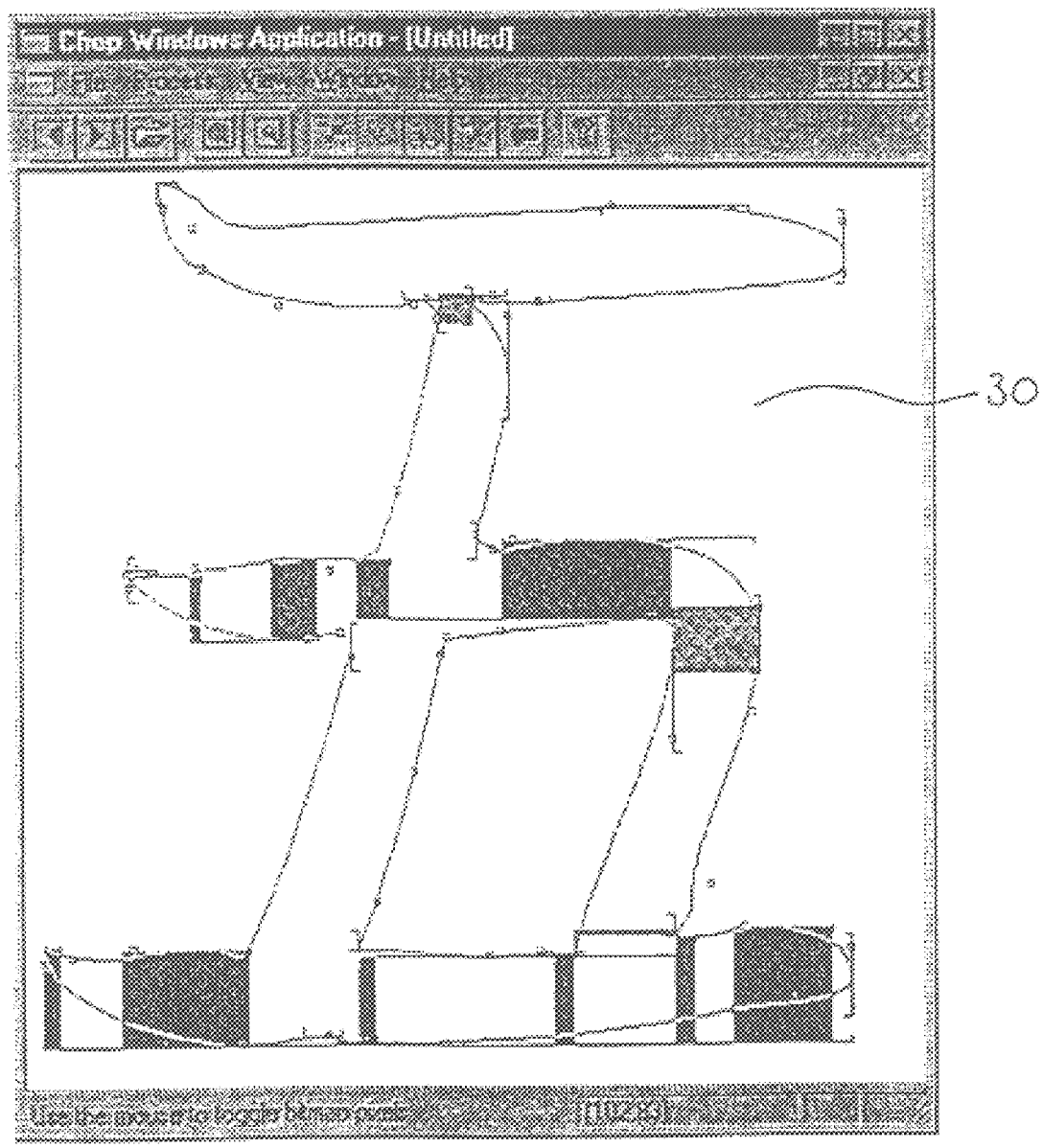
FIG. 6 shows the identified guideline display of FIG. 5 after identification of hints.

FIG. 6 shows the final stage of the conversion of the signature raster image into a font by "hinting". A hinted image 30 is produced from guidelines 28 by identifying the hints. For example, two types of TrueType™ hints include "stems" and "overshoot controls". Other types of hints could also be identified. After the hints have been identified, hinted image 30 is saved to a secure electronic signature file in a font format, for example in the TrueType™ font format.

Optionally, the rasterizer software application of the present invention can save the work done to a file at any stage of processing, in order to be able to continue work at a later time.

The preceding discussion centered on the production of an electronic signature which had the visual appearance of the manual, handwritten signature. Preferably, this electronic signature is converted into a Digital Chop object, for example by using OLE™ (Object Linking and Embedding) technology for producing an independent software object application (Microsoft, Inc., Seattle, Wash., USA). Using OLE™, independent software objects can be transferred through communication channels, or from one application to another. Although OLE™ is given herein as an example of the type of technology required, it is understood that this is for the purposes of discussion only and is not meant to be limiting.

The Digital Chop object is a program file which preferably contains three major components. The first component is a safeguard mechanism which permits activation of the rest of the program only after a correct password is entered.

The second component is a rasterizer for an image of the preferred font format, such as a TrueType™ font, customized to handle a single signature. This rasterizer is able to render the font file on the screen, and to convert it into a visible image. The third component is the secure electronic signature file with the encrypted binary data for a single signature, held as a single-character font. These components enable the electronic signature to be securely contained and displayed within an electronic document.

Preferably, the Digital Chop object is presented to the user as a GUI (Graphical User Interface) icon. The author of a message can drag and drop this icon into an electronic document, in a similar fashion as the "message attachment" feature of e-mail software applications. Dragging and dropping a signature into a document, as well as any editing of the contents of the message, will immediately invoke a dialog with a request for the author's password. If the correct password is entered, the author will be able to attach the electronic signature to the document in the form of the Digital Chop object, as well as to edit the document. If an incorrect password is entered, an error message will appear, and the author will not be able to attach the electronic signature or to edit the electronic document.

Preferably, an encrypted hash of the electronic document is also attached to the document at the time of signing. This encrypted hash is prepared in two steps. First, a hash is extracted from the electronic document. Next, the hash is encrypted using the private key of the author of the document. The encrypted hash is then attached to the electronic document, which is now ready to be sent.

To enable the message recipient to view the document, the sender can select one of two options. The first option is for an "open signature". With this option, no password will be required for viewing the signature. Instead, the electronic signature will automatically appear as part of the document. The second option is for a "hidden signature", in which the recipient must know a special "viewing" password in order to be able to see the signature, or even the entirety of the original document including the electronic signature.

In order to verify the authenticity of the electronic signature, a number of steps must be followed after the recipient has gained access to the electronic document and the signature, as described previously. First, the public key of the author of the document must be obtained. Next, the encrypted hash data is decrypted with the public key. Third, a new hash is calculated for the document. Fourth, the new hash is compared to the old hash. If the two are equal, then the signature is valid and the document has not been changed since the signature was attached.

Preferably, the Digital Chop object is compatible with a number of different operating systems which feature a GUI (Graphical User Interface) including, but not limited to, Windows '95™ Windows NT™, Windows 3.x™ ("x" standing for a version number of the operating system, all of Microsoft Inc., Seattle, Wash., USA) and Macintosh™ (Apple, Inc.) operating systems.

It will be appreciated that the above descriptions are intended only to serve as examples, and that many other embodiments are possible within the spirit and the scope of the present invention.

What is claimed:

1. A method for producing an electronic signature in a font format from a manual signature, comprising the steps of:

(a) providing a raster image of the manual signature;

(b) cleaning said raster image to remove noise, such that said raster image is a cleaned image;

(c) locating a plurality of edges of said cleaned image;

(d) producing an outline of said cleaned image from said plurality of edges;

(e) analyzing said outline to determine a plurality of guidelines for said cleaned image; and (f) hinting said cleaned image from said plurality of guidelines to produce the electronic signature in the font format.

2. The method of claim 1, wherein said raster image is in a format selected from the group consisting of a bitmap image and a graphic software application image.

3. The method of claim 1, wherein said noise includes pixels selected from the group consisting of solitary black pixels and missing pixels.

4. The method of claim 1, wherein said edges are located by finding a plurality of feature points of said cleaned image, said feature points being selected from the group consisting of curve points, horizontal extremum, vertical extremum, corners and tangents.

5. The method of claim 4, wherein said outline includes at least one closed sequence of Bezier curves and straight line segments connected end-to-end.

6. The method of claim 5, wherein said guidelines are determined according to said horizontal extremum points and said vertical extremum points.

7. The method of claim 1, wherein the font format is a TrueType™ font.

8. The method of claim 7, wherein said step of hinting said image includes identifying at least one hint selected from the group consisting of stems and overshoot controls.

9. The method of claim 1, further comprising the step of:

(g) preparing a digital chop object from the electronic signature in the font format by adding a rasterizer for the font format, said rasterizer being capable of rendering the electronic signature such that the electronic signature is converted into a visible image.

10. The method of claim 9, wherein said digital chop object is an OLE™ software object.

11. The method of claim 10, wherein said digital chop object further includes a safeguard mechanism such that said digital chop object is operable substantially only if a password is entered.

* * * * *